April 25, 1950 E. E. WEMP 2,505,447
CONTROL FOR CLUTCH AND ENGINE THROTTLES
Filed Feb. 3, 1944 6 Sheets-Sheet 5

Ernest E. Wemp
INVENTOR

Patented Apr. 25, 1950

2,505,447

UNITED STATES PATENT OFFICE 2,505,447

CONTROL FOR CLUTCH AND ENGINE THROTTLES

Ernest E. Wemp, Detroit, Mich.

Application February 3, 1944, Serial No. 520,905

13 Claims. (Cl. 192—.084)

This invention has to do with the transmission of power from a driving means to a driven means where the torque line is to be interrupted at times for one purpose or another and then reestablished. The invention is concerned particularly with the transmission of power from an engine to the traction wheels of an automotive vehicle where the engine is to be disconnected from the traction wheels for changing gears to effect different driving ratios and to permit the engine to run when the vehicle is standing at rest.

The invention relates particularly to a control system in an organization which includes an engine, a clutch, a speed change transmission and a speed control or throttle for the engine. While the invention is particularly directed for employment in automotive vehicles it is not necessarily limited to automotive vehicles.

In my application, Serial No. 506,402, filed October 15, 1943, now Patent No. 2,479,532, there is disclosed a control system of the nature above mentioned. The present invention embodies novel features of construction and operation although it relates to a similar control system. In accordance with the invention a centrifugal clutch is preferably employed which is normally disengaged at engine idling speed and which automatically engages by centrifugal action upon acceleration of the engine. Means are provided for acting upon the clutch so that when the vehicle decelerates the clutch is held engaged below that speed of movement where the clutch would otherwise become disengaged by the lowering of the centrifugal force. Thus, the vehicle can be operated at a speed of movement lower than that where the centrifugal clutch, in itself, would otherwise become disengaged. This means is preferably hydraulic and the means also serves to supplement clutch packing pressure. Accordingly, a light centrifugal clutch can be employed which facilitates a nicety of initial clutch engagement, and the clutch packing pressure is supplemented hydraulically. The hydraulic pressure is preferably obtained from a member driven by the clutch so that the hydraulic system operates with vehicle movement rather than engine movement.

Further, in accordance with the invention the procedure of disengaging the clutch, effecting a change of gears in the gear change transmission, and the re-engaging of the clutch is to a large degree standardized and yet a wide latitude is given to the individual driver or operator in which to exercise his own prerogative. This is accomplished in part by an interlocking system for operably connecting the clutch and the throttle, so that the clutch movements control the throttle during a period when it's disengaging, while it remains disengaged and while it's being re-engaged. In conjunction with this the clutch is hydraulically controlled as it is disengaged and re-engaged. As a result the driver or operator is required only to exert a single controlling action which is necessary in the making of a shift in gears and this action results in an automatic clutch disengagement and re-engagement, and an automatic interconnection between the clutch and the engine throttle.

One object of the invention is to provide a simple effective system comprising essentially a link and lever system through the means of which the throttle may be controlled by the operator and through the means of which the throttle and clutch become operably interconnected when the clutch is operated for disengagement and then re-engagement for gear shift purposes or the like. There is, in effect, a dual throttle control, one being the operator actuated treadle and the other being the clutch with means operable to freeze the treadle control in such a way that the control by the clutch becomes effective.

A further object of the invention is to provide an over-control for the operator which is useful, particularly before the engine is warmed up, as for example, when the engine has just been started. The cold engine may die or "cough" and this condition may be remedied or overcome by one or more depressions of the throttle in quick succession. The over-control permits the operator to so actuate the throttle.

Other objects and advantages of the invention will become apparent as the following detailed disclosure is considered in conjunction with the accompanying drawings wherein one form of structure for carrying out the invention is disclosed.

An engine block is illustrated at 1 and the crank shaft of the engine is shown at 2. The floor boards of an automotive vehicle are generally illustrated at 3. The clutch, which is of the centrifugal type, resides in a fly wheel 4 and a cover plate 5. Secured thereto in driving relationship is a pressure plate 6. The pressure plate and fly wheel constitute driving members and are arranged to pack therebetween the facings 7 of a clutch driven member 8 mounted upon driven shaft 9. The end of the driven shaft may be piloted in the fly wheel by a bearing 10.

Figure 2:
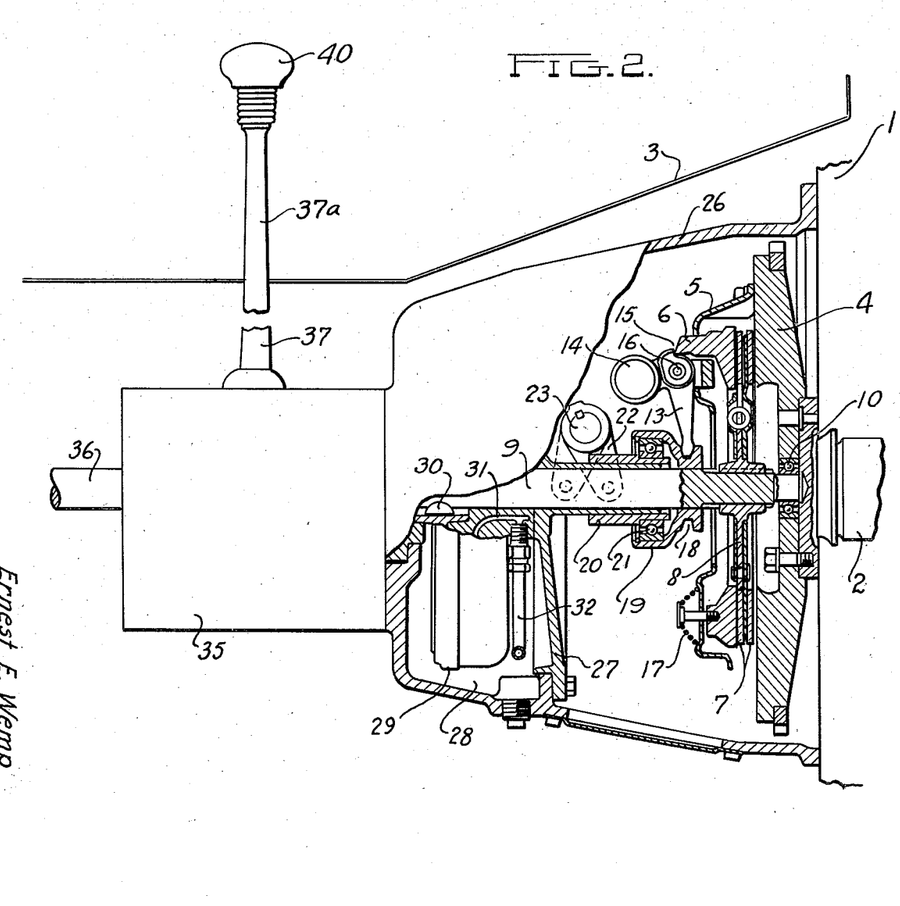
Fig. 2 is a view with parts cut away showing the clutch structure and the hydraulic pump.

A plurality of levers, of which there may be three, are pivotally mounted on the cover plate and each has a lever arm 13 and a weighted mass 14 and arranged to engage the pressure plate as at 15, the pivot for the lever being at 16. Centrifugal force causes the mass 14 to shift outwardly and push the pressure plate to the right as Fig. 2 is viewed for clutch engagement. A series of springs 17 serve normally to retract the pressure plate for clutch disengagement.

The inner ends of the levers 13 are located in a groove 18 of an operating member 19 connected to a control sleeve 20 preferably through the means of an anti-friction bearing 21, the control sleeve being shiftable by a yoke 22 mounted upon a clutch controlling rock shaft 23. In the full line position of the yoke as shown in Fig. 2 the sleeve 20 is located to the right and the clutch is disengaged. When the clutch is engaged the yoke is in the dotted line position.

The clutch housing 26 is divided by a partition 27 thus forming a dry compartment for the clutch and a liquid sump 28. A suitable pump, generally illustrated at 29, is positioned in the sump chamber and it is driven by the driven shaft as by means of the key 30. The outlet of the pump is the duct 31 which connects into outlet tube 32 which passes out through the side of the housing as at 33. The details of the pump are not shown, but suffice it to say that when the shaft 9 is operating the pump is actuated and liquid is pumped from the sump into and through the outlet tube 32.

Figure 1:
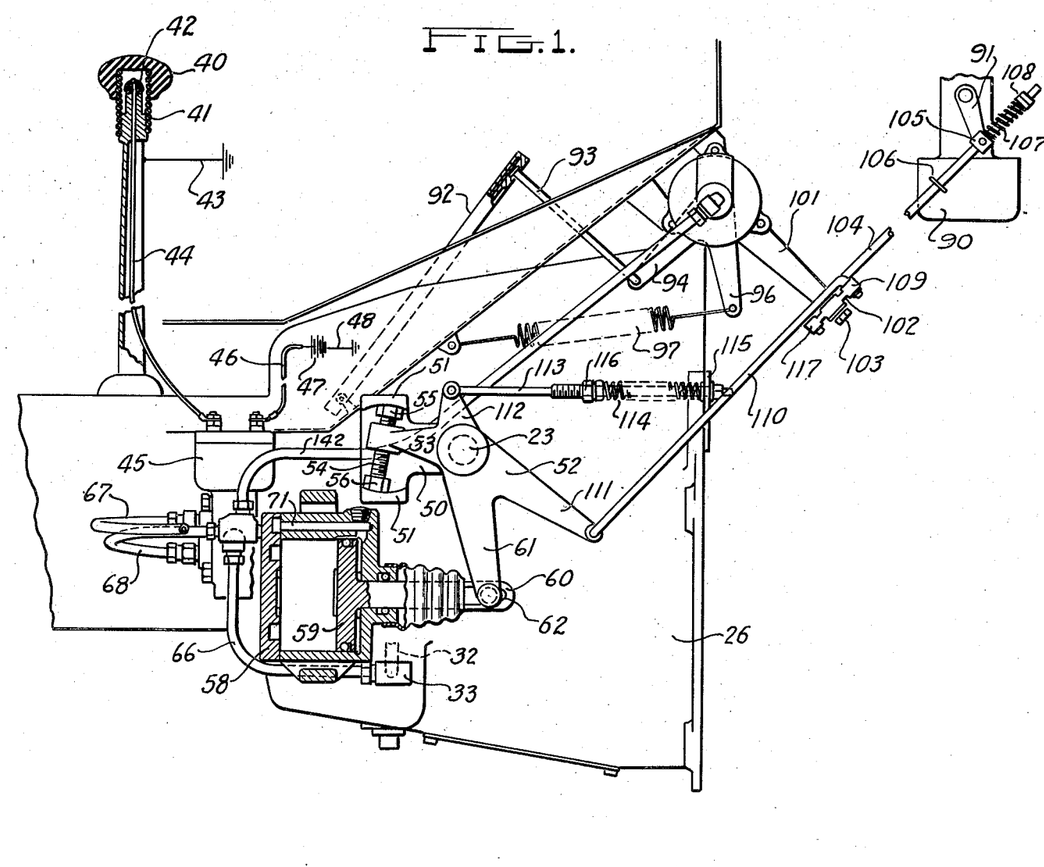
Fig. 1 is a side elevational view, with some parts cut away and some parts shown in section, showing the control system with the interconnecting link and lever system for the clutch and throttle.

The driven shaft 9 extends into a suitable gear change transmission in the case 35 and a propelling shaft 36 extends from the transmission. The gears may be changed to effect different driving ratios by gear shift member 37. The gear shift member 37 may be actuated by a member 37a which may be directly connected with the member 37 or remotely connected thereto. A hand grip or knob 40 is connected to the member 37a flexibly as by means of a coil spring 41 so that pressure on the hand grip may shift the same relative to the member 37a and establish an electrical contact. As shown in Fig. 1, there is an insulated contact member 42 arranged to be contacted by the spring, and the spring through the member 37a is grounded as at 43. A conductor 44 leads from the contact 42 to the solenoid 45 of a control valve, while a conductor 46 leads from the solenoid to a suitable source such as a battery 47 grounded as at 48. It will be apparent that when the hand grip is shifted on its flexible mounting and a contact is made between the spring and the contact piece 42, that the circuit is completed through the solenoid for purposes which will presently appear.

The clutch is controlled hydraulically by the liquid pressure provided by the pump and to this end the clutch control shaft 23 extends out through the wall of the housing 26 and has keyed thereon an arm 50 with two spaced abutments 51. Rotatably mounted on the shaft 23 is a lever member 52 which has an arm 53 with a threaded stud 54 therein, with a head 55 engaging one abutment and a nut 56 engaging the other abutment. Thus the clutch shaft and the member 52 are connected together for rocking motion in unison and the arrangement of the threaded stud and its contact with the members 51 provide for an adjustment.

Figures 3, 4, 5:
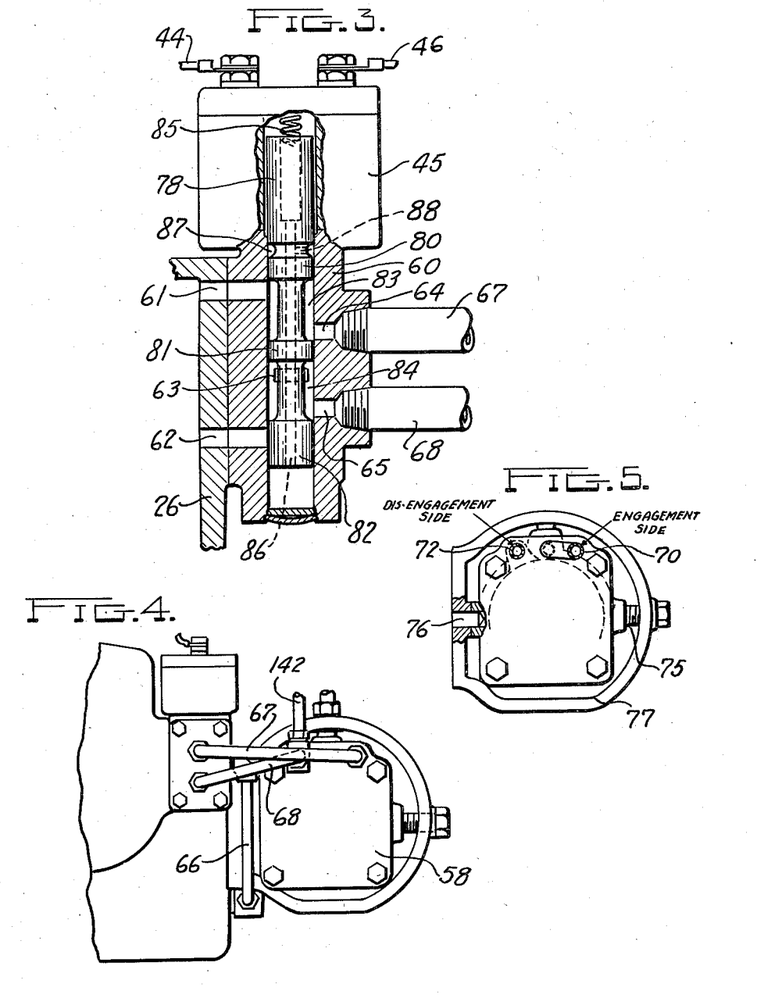
Fig. 3 is a somewhat enlarged view, partly in cross section, showing the controlling valve for the hydraulic system.
Fig. 4 is a partial rear elevational view looking from the left of Fig. 1 and showing the conduit arrangement for the hydraulic system.
Fig. 5 is a view showing the mounting of the controlling cylinder and the porting of the cylinder.

There is a clutch operating cylinder 58 with a piston 59 therein having a piston rod 60 connected to the arm 61 of the member 52. The connection between the piston rod and member 61 has a small amount of lost-play as provided by the elongated slot 62 for purposes which will presently appear. The liquid or oil under pressure is conducted into the cylinder selectively in one end or the other for engagement and disengagement of the clutch and this is accomplished through a control valve in turn controlled by the solenoid 45. As shown in Fig. 3 this valve comprises a casing 60 which is attached to the side wall of the housing 26, the housing and the pump having aligned apertures forming a port 61 and a port 62 opening into the sump. The chamber in the valve housing has an inlet port 63 and two other ports 64 and 65. A conduit 66 extends from the outlet of the pump to the inlet port 63. A conduit 67 connects to the port 64 and a conduit 68 connects to the port 65. Conduit 67 connects to a port 70 in the cylinder which in turn connects to a passage 71 (Fig. 1) which extends to the right hand end of the cylinder as Fig. 1 is viewed. The conduit 68 connects to port 72 which connects to the left hand end of the cylinder as Fig. 1 is viewed. The cylinder is itself advantageously mounted on trunnions 75 and 76 carried by a bracket 77 so that it may rock as its piston rod swings in the arc determined by the arm 61.

The valve member 78 comprises lands 80, 81 and 82 and is shaped to provide passages 83 and 84 and the member is acted upon by a coil spring 85. The valve member preferably has a passage therethrough from end to end so that liquid may not be trapped. This passage, as indicated at 86, communicates with a circumferential groove 87 by a lateral port 88. Liquid which may leak past the end lands has access to the passage 86 and thence into the circumferential groove 87 which at times communicates with the port 61 so that the trapped liquid may escape back to the sump.

The valve is positioned, in Fig. 3, to provide for clutch disengagement, the valve member being elevated into the position shown by reason of the solenoid being energized. In this position liquid from the pump passes through port 63, passage 64, conduit 68 to the left hand end of the cylinder as Fig. 1 is viewed thus pushing the piston to the position shown in Fig. 1. This rocks the throw out shaft counter-clockwise and pushes the sleeve 20 to the right as Fig. 2 is viewed. This swings the lever arms 13 counter-clockwise and shifts the centrifugal weights 14 inwardly against centrifugal force thus taking the load thereof off the pressure plate, so that the pressure plate is retracted and the clutch disengaged. The liquid which was to the right of the piston as Fig. 1 is viewed, is discharged through the passage 71, conduit 67, port 64, passage 83 and back to the sump through port 61.

When the solenoid is de-energized the valve moves down under the action of the spring so that the land 81 is positioned between the ports 63 and 65. The passage 84 now connects the ports 65 and 62. The passage 83 now connects the ports 63 and 64 and the land 80 closes the port 61, except for the fact that the groove 87 is aligned therewith for the escape of trapped liquid. In this position liquid entering the port 63 from the pump passes through passage 83 into line 67 and into the cylinder through passage 71. This shifts the piston to the left as Fig. 1 is viewed and rocks the clutch shaft 23 clockwise thus shifting the control sleeve 20 to the left rocking the clutch levers clockwise so that the pressure plate moves to the right and the clutch is engaged. When the piston 59 is shifted to the left the liquid in advance thereof is discharged through the conduit 68, through passage 84 and back to the sump through port 62.

When the piston has reached the end of its movement and is in clutch engagement position in the left hand end of the cylinder as Fig. 1 is viewed, its position becomes fixed. As the engine is accelerated centrifugal force increases and the normal compressibility of the driven member permits of a further compressive action, and then too there is a measure of yieldability in the cover plate, and these things cause a further movement of the member 52 clockwise without movement of the piston rod 60 which is permitted by the lost-play connection 62. This takes the thrust off the throw out sleeve 20 and therefore removes the end thrust on the crank shaft. Thus at reasonably normal and high R. P. M.'s of engine operation there is no end thrust on the engine crank shaft exerted by the hydraulic system. The connection between the member 52 and the member 50 may be properly adjusted when the clutch facings are new. As the clutch facings wear and become thinner in use, an adjustment may be made at this point to provide a proper connection between the clutch and the hydraulic piston.

Figure 6:
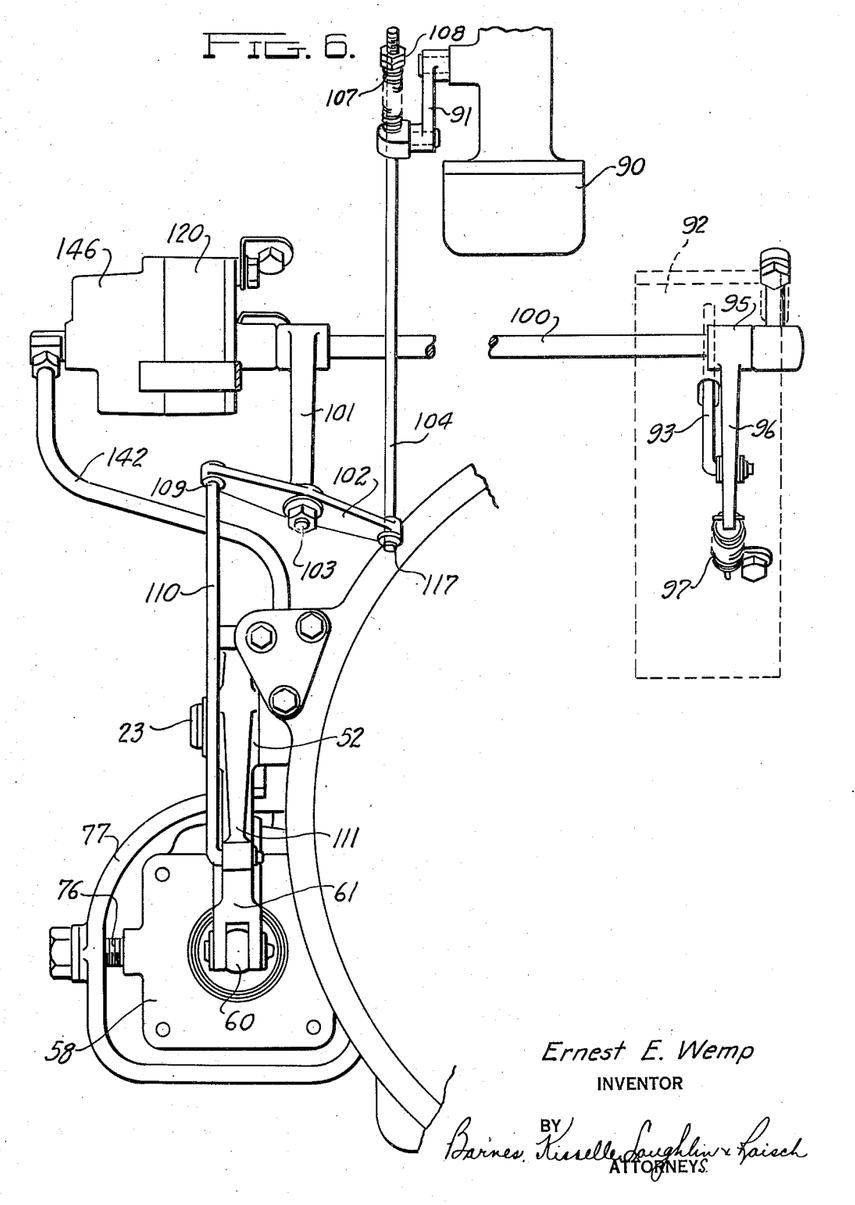
Fig. 6 is a view, slightly enlarged in character, looking from the right of Fig. 1 showing some of the link and lever system.
Figure 7:
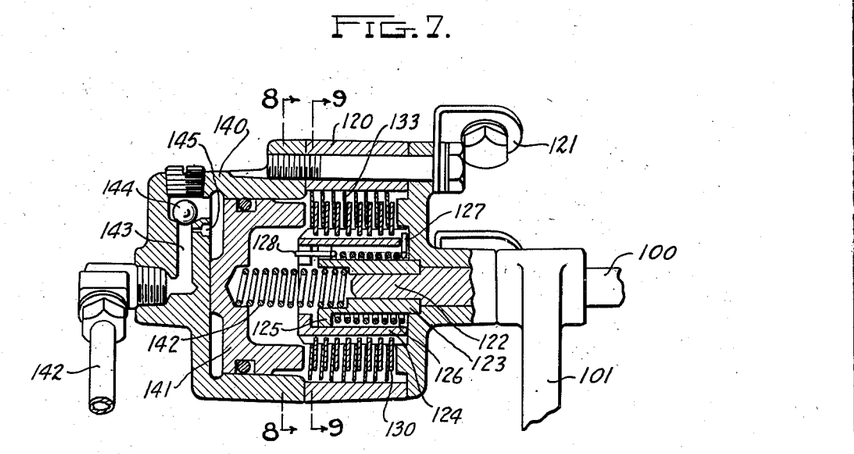
Fig. 7 is a cross sectional view taken through a hydraulically controlled clutch which governs the condition of the interlocking lever system between the clutch and the throttle.
Figure 8:
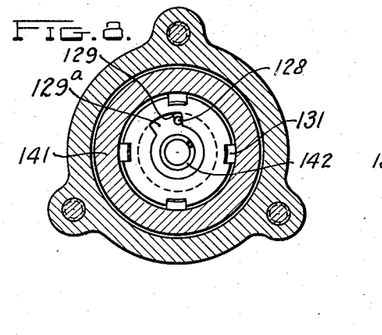
Fig. 8 is a cross sectional view taken substantially on line 8—8 of Fig. 7 showing some of the control clutch parts.
Figure 12:
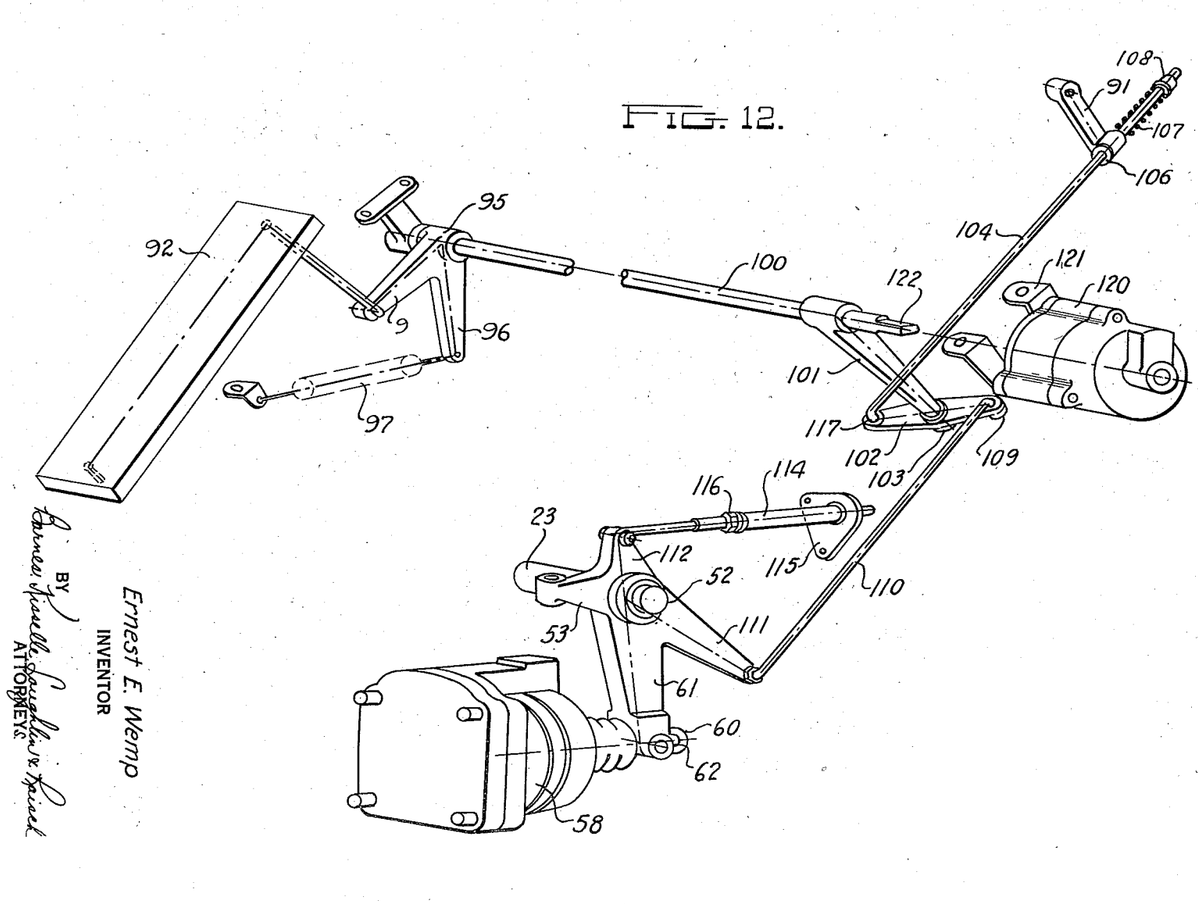
Fig. 12 is a diagrammatic view of a perspective nature showing the link and lever system.

By making reference now to Figs. 1, 6, and 12, the interlinking system between the throttle and its control and the clutch will be seen. The carburetor is shown at 90 having a valve controlling or throttle arm 91. A foot treadle for controlling the throttle is shown at 92 which is connected by a push link 93 to an arm 94 of a bell crank lever 95 which is provided with a further arm 96. Connected to the arm 96 is the usual retractor spring 97. The bell crank 95 is keyed or otherwise fixed to a cross shaft 100. An arm or lever 101 is affixed to the cross shaft and this arm carries a pivotally mounted lever 102 which may be likened to a whiffle-tree, the lever 102 being pivotally mounted on the arm 101 as at 103. A rod 104 is connected to one end of the lever 102 at 117 and to the throttle arm 91. As shown in Fig. 1 the rod 104 extends through an apertured boss 105 slidably and it has a fixed abutment 106 on one side of the boss and a spring 107 engaging the other side of the boss and reacting against a nut 108. The other side of the lever 102 is connected at 109 to a rod 110 which in turn connects to arm 111 of the clutch control member 52. As shown herein the lever 102 is evenly balanced in that its pivotal mounting 103 is equidistant between the connections 109 and 117 although this arrangement may be varied and the lever need not be evenly balanced in this respect.

The clutch control member 52 has another arm 112 to which is connected a rod 113 which passes through a compression spring 114 reacting against an abutment 115 and the compression of the spring may be adjusted through the means of a nut 116 threaded on the rod 113. The R. P. M. at which the clutch normally tends to engage and disengage by centrifugal action may be controlled and adjusted through the means of the retractor springs which function against centrifugal force. Some of these springs as at 17 are located inside the clutch and serve to retract the pressure plate. The additional spring 114 is located outside the clutch. This spring places a thrust on the clutch control shaft 23 tending to rock it counter-clockwise and to shift the sleeve 20 to the right as Fig. 1 is viewed thus tending to disengage the clutch. Therefore both the springs 17 and the spring 14 serve as retractor springs and function against centrifugal force. This spring retraction may be varied by adjusting a compression of the spring 114 which is exposed and can be easily reached. By increasing the tension on the spring 114, the R. P. M. of clutch engagement under centrifugal force is raised; by reducing the tension on the spring 114, the R. P. M. of clutch engagement under centrifugal force is lowered.

There is an arrangement for freezing the position of the rock shaft 100, except for an over-control arrangement, and this takes the form of a hydraulically controlled clutch or coupling disposed in a housing and generally indicated at 120. In the diagrammatic view Fig. 12, this clutch is removed from the end of the shaft 110 for purposes of clarity. This clutch structure is shown particularly in Figs. 7 to 11, the housing or casing 120 being mounted in position by suitable brackets 121. The end of the shaft 100 may be flattened as shown at 122 and a sleeve 123 is placed thereon. Another sleeve 124 is placed over sleeve 123 and piloted by a flange 125, to provide a space between the two sleeves in which is disposed a coil spring 126. One end of the spring at 127 is fastened to the outer sleeve 126; the other end of the spring at 128 passes through a notch 129 in the flange 125 and is accordingly fixed to the sleeve 123. The flange on exposed end of the outer sleeve 126 has a segment cut therefrom as at 129a to provide clearance and freedom of movement of the extending end 128 of the spring.

The clutch proper is preferably a multiple disc clutch; one set of discs 130 are splined to the sleeve 126 as shown at 131 (Fig. 9); the intervening discs 132 are splined to the casing as at 133.

Figures 9, 11:
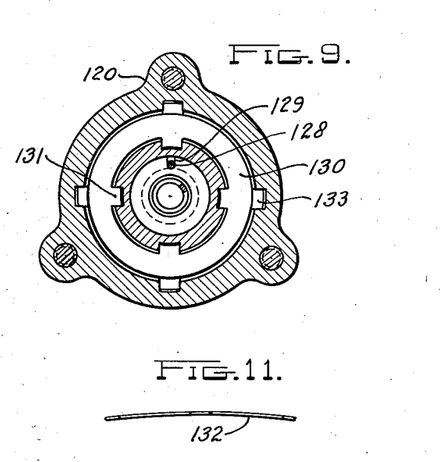
Fig. 9 is a sectional view taken substantially on line 9—9 of Fig. 7 showing some of the disc arrangement in the controlling clutch.
Fig. 11 is a side view of the disc shown in Fig. 10 and illustrating its curved construction.
Figure 10:
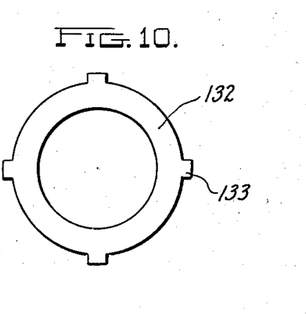
Fig. 10 is an elevational view of one of the clutch discs.

One set of discs as, for example, the discs 130 may be flat while the other set, for example, the discs 132, are dished as shown at Fig. 11. Accordingly, as the discs are packed together, there is a gradual clutch engagement as the dished discs become flattened under pressure and when the clutch is undergoing a disengaging action the disengagement is gradual as the dished discs become unpacked and return to their normal dished position.

The housing has an end portion 140 which constitutes a cylinder in which is disposed a piston 141 acted upon by a spring 142 which may react against the inner sleeve 123. There is a liquid line 142 which connects into the line 68 advantageously at the cylinder 58. The line 142 therefore connects into the hydraulic system on the clutch disengaging side of cylinder 58 and the line 142 connects into the cylinder 140 through a port 143 provided with a check valve 144. There is a bleeder port 145 which by-passes the check valve.

In considering the operation of the structure, reference will first be made to the operation of the centrifugal clutch and the hydraulic system without making reference to the throttle control and interconnecting linkage. When the vehicle is at rest the centrifugal clutch is disengaged as shown in Fig. 2 and the hydraulic pump is not operating because the shaft 9 is at rest. Upon acceleration of the engine the centrifugal weights 14 cause clutch engagement. As mentioned above the clutch may be relatively lightly weighted and thus a smooth clutch engagement may be had. Indeed, the clutch may be of such a light nature as to not have the capacity from centrifugal force along for transmitting full engine torque until a fairly high R. P. M. is obtained say, for example, about 2400 R. P. M. As soon, however, as the clutch begins to engage, the shaft 9 begins to turn and starts to operate the pump. If the transmission 35 is in gear, then the pump functions with vehicle movement. The valve 80 is normally in a lowered position as Fig. 3 is viewed with the result that the liquid under pressure is transmitted through port 63, passage 83, line 67, passage 71 and to the right hand end of the cylinder or the engagement side of the piston as Fig. 1 is viewed. This shifts the piston to the left and the hydraulic pressure thus supplements clutch packnig pressure. As soon, however, as sufficiently adequate R. P. M. is attained, which may be about that R. P. M. where the centrifugal force is adequate to provide a clutch capacity for transmitting maximum engine torque, the compressibility of the clutch driven member permits of a further clutch movement, without movetment of the piston, because of the lost-play connection 62, and thus the end thrust exerted on the engine shaft by the hydraulic control piston is relieved.

Visualizing now the vehicle operating in a normal high gear and decelerating; normally the centrifugal clutch would become disengaged at about 800 engine R. P. M. But the pump is still operating so that the hydraulic control cylinder maintains the clutch closed with the result that the clutch may remain engaged with sufficient torque transmitting capacity to transmit the torque of the engine at these low speeds down to any suitable vehicle speed say, for example, a speed represented by three or four hundred engine R. P. M.

Assume now that a gear shift is to be made, considering again, the operation of the clutch and hydraulic system without regard to the interconnecting link system. Let us suppose the vehicle is under way in a low gear with the clutch engaged and with the piston 59 in clutch engaged position which is at the left hand end of the cylinder as Fig. 1 is viewed. The clutch may now be engaged both by centrifugal force and by the supplementing pressure of the hydraulic system. The operator takes hold of the knob 40 and exerts a gear shifting action thereon. This flexes the spring 41, makes a contact between the spring and the contact piece 42, thus completing the circuit above described, so that the solenoid lifts the valve to the position shown in Fig. 3. The liquid under pressure now passes from the pump and into the cylinder on the disengaging side of the piston or, in other words, on the left side of the piston as Fig. 1 is viewed. The liquid under pressure pushes the piston to the position shown in Fig. 1, thus forcibly rocking the control shaft counterclockwise, pushing the control sleeve 20 to the right and disengaging the clutch against centrifugal force. After the gear shift has been made, the operator releases the knob 40 and the electrical circuit is broken and the valve member drops to its lower position. This introduces liquid into the cylinder on the engagement side of the piston through line 67, thus shifting the piston back toward its left hand position and effecting clutch engagement. The several parts in Fig. 1 are shown with the clutch disengaged and with the throttle in an idling condition.

The hydraulic system is arranged so that the clutch may be disengaged against centrifugal force at any engine operating speed. It will be appreciated that the centrifugal force varies with the square of the speed and that at high engine R. P. M. considerable power is needed to disengage the clutch. An advantageous arrangement is to provide a pump where the liquid pressure also varies with the square of the speed so that the hydraulic system is capable of disengaging the clutch at any speed of operation. Such a pump is disclosed in my above mentioned application.

Considering now the operation of the structure including the throttle and the interconnecting linkage system; the operator has full control of the throttle through the treadle 92 under all normal operating conditions. When the treadle is depressed the shaft 100 is rocked and with the clutch engaged the rod 110 holds the end 109 of the lever 102 in a retracted and fixed position. Therefore, operation of the treadle rocks the arm 101 which in turn rocks the lever 102 about the point 109. The lever 102 now functions as a lever of the third class. As the treadle is depressed the rod 104 is pushed to cause the abutment 106 to engage and rock the throttle arm 91 counterclockwise as Fig. 1 is viewed. As the treadle is released, the spring 97 functions to reverse the action, in which case the throttle arm 91 is rocked clockwise as Fig. 1 is viewed by the spring 107. The lever 102 therefore provides a leverage advantage between the treadle and the throttle arm.

When a gear shift is to be made, the operator grasps the knob 40 and this, as above described, closes the circuit and introduces liquid into the clutch disengagement side of the cylinder to effect clutch disengagement. At the same time pressure liquid passes through line 142 into the cylinder 140 and pushes the piston 141 to the right thus engaging the clutch 129. This freezes the rock shaft 100 and the arm 101. The clutch plates 132 are non-rotatable and they become packed with the clutch plates 132 which are connected to the rock shaft 100 through the spring 126 and an inner sleeve 123. The operator need not exert any controlling action on the treadle but may allow it to remain in whatever position it was in at the time the gear shifting action started. As the hydraulic control piston 59 shifts to the right for disengaging the clutch, it pushes the rod 110 and the lever 102 now rocks about the connection 103 as its fulcrum. The lever 102 now functions as a lever of the first class. This action pulls the rod 104 and thus shifts the throttle arm 91 clockwise to substantially engine idling position as shown in Fig. 1. Of course, it is to be appreciated that the rock shaft 100 may be frozen in any one of numerous positions, whereas the clutch controlling member has a definite range of movement between clutch engaged and clutch disengaged positions. The spring 107 absorbs any differential movement and where the clutch controlling member arm 111 tends to move the throttle arm 91 a distance further than it can move, the spring 107 compresses after the throttle arm is in idling position as shown in Fig. 1. Thus the engine is automatically controlled and its throttle automatically brought to substantially idling position. When the change of gears has been made and the operator releases the knob 40, the control valve shifts to its normal position and the clutch begins to engage. In this action the clutch controlling member 52 pulls on the rod 110 and shifts the throttle arm back to substantially the position it was in when the shaft 100 was frozen. At the same time the liquid pressure in the cylinder 140 is released and the spring 142 pushes the piston 141 back to the left displacing the liquid in advance of it to disengage the freezing clutch to thus restore the throttle control to the operator. This action may be suitably timed to the clutch engaging action by the bleed port 140. The ball 144 checks the displaced liquid so that the liquid is displaced through the bleed port thus causing a proper timed disengaging action of the treadle freezing clutch.

It will be observed how this arrangement standardizes the process of shifting gears. Some operators tend to wear out the clutch facings by racing the engine during clutch engagement thus unduly slipping the clutch as it is being engaged. Others may cause the clutch to engage rather quickly with the engine operating at a speed lower than what it should be to be synchronized with the vehicle movement. With the present arrangement, the treadle is frozen in position during clutch disengagement and the engine throttle brought down to substantially idling speed. Then as the clutch is engaging the engine throttle is advanced to substantially the location where it was located when the treadle was frozen. The arrangement may be set up so that the treadle is frozen when the clutch is about ⅓ disengaged and then restored to the control of the operator when the clutch is about ⅔ engaged.

As mentioned above there may be times when it is necessary for the operator to exert his control over the automatic control as, for example, when the engine is cold and before it is warmed up to a proper operating temperature. Under these conditions the engine may "cough" and even stop operating. The operator may give the foot treadle one or more depressions in quick succession to remedy this situation. This is the purpose of the spring 126. The spring provides a yieldable connection between rock shaft 100 and the freezing disc clutch. In this action the shaft 100 is forcibly rocked, thus also rocking the inner sleeve 123 and moving the end 128 of the spring although the end 127 of the spring is held fixed. The cut away 129a in the flanged end of the outer sleeve permits this movement of the end 128 of the coil spring.

I claim:

1. In combination, an engine, a throttle for the engine, means driven by the engine, a clutch between the engine and said means arranged to be engaged and disengaged, means under the control of the operator for causing clutch disengagement and for causing clutch re-engagement, operator actuated means for operating the throttle including a rocker arm, clutch actuated means for operating the throttle including a member moveable with clutch movement, a lever pivoted in its intermediate portion to the rocker arm, a link connecting one end of the lever to the throttle, a link connecting the other end of the lever to said member and means operable as the clutch is disengaging for locking said rocker arm in a substantially fixed position and for holding same in said position until the clutch is re-engaging.

2. In combination, an engine, a throttle for the engine, means driven by the engine, a clutch between the engine and said means arranged to be engaged and disengaged, means under the control of the operator for causing clutch disengagement and for causing clutch re-engagement, operator actuated means for operating the throttle including a rocker arm, clutch actuated means for operating the throttle including a member moveable with clutch movements, a lever pivoted in its intermediate portion to the rocker arm, a link connecting one end of the lever to the throttle, a link connecting the other end of the lever to said member, means operable as the clutch is disengaging for locking said rocker arm in a substantially fixed position and for holding same in said position until the clutch is re-engaging, and yieldable means in the operator actuated means providing an over-control for the rocking of the rocker arm by the operator upon application of added force thereto.

3. In combination, an engine, a throttle for the engine, means driven by the engine, a clutch between the engine and said means arranged to be engaged and disengaged, means under the control of the operator for causing clutch disengagement and for causing clutch re-engagement, an operator controlled rock shaft, a rocker arm on the rock shaft, a lever rockably mounted on the rocker arm, a link connecting one end of the lever to the throttle, a link connecting the other end of the lever with the clutch operating means, whereby when the clutch operating means is stationary the operator may control the throttle by oscillating the rock shaft and means operable to hold the rock shaft in a substantially fixed position when the clutch is disengaging during clutch disengagement and operable to release the rock shaft when the clutch is re-engaging whereby clutch movements control the throttle.

4. In combination, an engine, a throttle for the engine, means driven by the engine, a clutch between the engine and said means arranged to be engaged and disengaged, means under the control of the operator for causing clutch disengagement and for causing clutch re-engagement, an operator controlled rock shaft, a rocker arm on the rock shaft, a lever rockably mounted on the rocker arm, a link connecting one end of the lever to the throttle, a link connecting the other end of the lever with the clutch operating means, whereby when the clutch operating means is stationary the operator may control the throttle by oscillating the rock shaft, means operable to hold the rock shaft in a substantially fixed position when the clutch is disengaging during clutch disengagement and operable to release the rock shaft when the clutch is re-engaging, whereby clutch movements control the throttle, and yieldable over-control means associated with the means for holding the rock shaft substantially fixed so that the operator by applying additional force, may cause said means to yield to control the throttle during clutch disengagement.

5. Throttle control means for the engine of an organization having a clutch arranged to be engaged and disengaged, a throttle arm, freely movable operator actuated means, clutch actuated means, a whiffletree type of connection between the operator actuated means and clutch actuated means and the throttle arm, whereby when the clutch actuated means is in a fixed position the throttle may be controlled by the operator actuated means, and normally free coupling means automatically operable to coupled condition by and substantially simultaneously with movement of the clutch actuated means for holding the operator actuated means fixed substantially in the position then existing, whereby the throttle is controlled by the clutch actuated means.

6. In combination, an engine, a throttle therefor, means driven by the engine, a clutch between the engine and said means arranged to be engaged and disengaged, clutch actuating means under the control of the operator for causing clutch disengagement and for causing clutch re-engagement, an operator actuated throttle control shaft, a member moveable with the clutch upon its engagement and disengagement, means including linkage interconnecting said member, said shaft and said throttle, so that the shaft may control the throttle when said member is stationary and so that the member may control the throttle when the shaft is stationary, a normally disengaged clutch between the shaft and a stationary member and means operable to cause engagement of the second named clutch upon actuation of the said clutch actuating means for the first named clutch.

7. In combination, an engine, a throttle therefor, means driven by the engine, a clutch between the engine and said means arranged to be engaged and disengaged, clutch actuating means under the control of the operator for causing clutch disengagement and for causing clutch re-engagement, an operator actuated throttle control shaft, a member moveable with the clutch upon its engagement and disengagement, means including linkage interconnecting said member, said shaft and throttle, so that the shaft may control the throttle when said member is stationary and so that the member may control the throttle when the shaft is stationary, a normally disengaged clutch between the shaft and a stationary member, means operable to cause engagement of the second named clutch upon actuation of the actuating means for the first named clutch, and a yieldable element between the shaft and the second named clutch providing an over-control for the shaft when the second named clutch is engaged.

8. In combination, an engine, a throttle therefor, means driven by the engine, a clutch between the engine and said means arranged to be engaged and disengaged, a pump for supplying liquid under pressure, clutch operating means operable by the pressure liquid and under the control of the operator for causing clutch disengagement and for causing clutch re-engagement, an operator actuated throttle control shaft, a member moveable with the clutch upon its engagement and disengagement, means including linkage interconnecting said member, said shaft and said throttle, so that the shaft may control the throttle when said member is stationary and so that the member may control the throttle when the shaft is stationary, a normally disengaged clutch for clutching the control shaft to a stationary element, a cylinder with a piston therein for engaging the second named clutch and a conduit for conducting pressure liquid to the cylinder upon actuation of the clutch operating means for the first named clutch.

9. In combination, an engine, a throttle therefor, means driven by the engine, a clutch between the engine and said means arranged to be engaged and disengaged, a pump for supplying liquid under pressure, clutch operating means operable by the pressure liquid and under the control of the operator for causing clutch disengagement and for causing clutch re-engagement, an operator actuated throttle control shaft, a member moveable with the clutch upon its engagement and disengagement, means including linkage interconnecting said member, said shaft and said throttle, so that the shaft may control the throttle when said member is stationary and so that the member may control the throttle when the shaft is stationary, a normally disengaged clutch for clutching the control shaft to a stationary element, a cylinder with a piston therein for engaging the second named clutch, a conduit for conducting pressure liquid to the cylinder upon actuation of the clutch operating means for the first named clutch, and a bleed port in the cylinder for timing the discharge of the pressure liquid therefrom in the disengaging of the second named clutch.

10. In combination, an engine, a throttle therefor, means driven by the engine, a clutch between the engine and said means arranged to be engaged and disengaged, clutch actuating means under the control of the operator for causing clutch disengagement and for causing clutch re-engagement, an operator actuated throttle control shaft, a member moveable with the clutch upon its engagement and disengagement, means including linkage interconnecting said member, said shaft and said throttle, so that the shaft may control the throttle when said member is stationary and so that the member may control the throttle when the shaft is stationary, a normally disengaged clutch associated with the said shaft and a stationary member, a cylinder with a piston therein for engaging the second named clutch and means operable to conduct liquid under pressure into the cylinder for engaging the second named clutch upon actuation of the actuating means for the first named clutch.

11. In combination, an engine, a throttle therefor, means driven by the engine, a clutch between the engine and said means arranged to be engaged and disengaged, clutch actuating means under the control of the operator for causing clutch disengagement and for causing clutch re-engagement, an operator actuated throttle control shaft, a member moveable with the clutch upon its engagement and disengagement, means including linkage interconnecting said member, said shaft and said throttle, so that the shaft may control the throttle when said member is stationary and so that the member may control the throttle when the shaft is stationary, a normally disengaged clutch associated with the said shaft and a stationary member, a cylinder with a piston therein for engaging the second named clutch, means operable to conduct liquid under pressure into the cylinder for engaging the second named clutch upon actuation of the actuating means for the first named clutch, a check valve and a bleeder port in said cylinder for the bleeding of pressure liquid therefrom to control the timing of the disengagement of the second named clutch.

12. Throttle control means for the engine of an organization having a clutch arranged to be engaged and disengaged, a movable throttle element, first and second control means, the first one of which is freely movable and is actuated by an operator and the second of which is automatically actuated by and with movement of the clutch in its engaging and disengaging action, a rocker arm, said rocker arm being connected adjacent one end thereof to the said throttle element and connected adjacent its opposite end to the second control means and at an intermediate location with the first control means, whereby, upon operation of the second control means, while the first control means is in a fixed position the rocker arm performs as a number one lever about the first control means to operate the throttle element, and upon operation of the first control means, while the second control means is in a fixed position the rocker arm performs as a number three lever about the second control means to operate the throttle element.

13. In combination, an engine, a throttle therefor, means driven by the engine, a clutch between the engine and said means arranged to be engaged and disengaged, clutch actuating means under the control of the operator for causing clutch disengagement and for causing clutch reengagement, a freely movable operator actuated throttle control element, a member movable with the clutch upon its engagement and disengagement, means interconnecting said member, said element and said throttle, so that actuation of the element may control the throttle when said member is in a fixed position and provides reaction to such actuation, and so that movement of the member may control the throttle when said element is in a fixed position and provides reaction to such movement, a normally disengaged coupling means between the element and a stationary member and means operable to cause engagement of the coupling means upon actuation of said clutch actuating means.

ERNEST E. WEMP.

REFERENCES CITED

The following references are of record in the file of this patent:

UNITED STATES PATENTS

| Number | Name | Date |
|---|---|---|
| 2,117,016 | Brumbaugh | May 10, 1938 |
| 2,128,165 | Sanford | Aug. 23, 1938 |